US010889078B2

(12) United States Patent
Kao et al.

(10) Patent No.: US 10,889,078 B2
(45) Date of Patent: Jan. 12, 2021

(54) OPTICAL SPACER INCLUDING CONTROLLED LOCATED APERTURE AND METHOD OF MANUFACTURING THE SAME

(71) Applicant: OmniVision Technologies, Inc., Santa Clara, CA (US)

(72) Inventors: Tim Kao, Santa Clara, CA (US); Chia-Yang Chang, Sunnyvale, CA (US); Livia Li, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 176 days.

(21) Appl. No.: 14/819,103

(22) Filed: Aug. 5, 2015

(65) Prior Publication Data

US 2017/0036407 A1 Feb. 9, 2017

(51) Int. Cl.
| B29D 11/00 | (2006.01) |
| B29C 33/00 | (2006.01) |
| B29C 33/48 | (2006.01) |
| B29K 105/00 | (2006.01) |

(52) U.S. Cl.
CPC .... *B29D 11/00365* (2013.01); *B29C 33/0033* (2013.01); *B29C 33/485* (2013.01); *B29D 11/00298* (2013.01); *B29K 2105/0058* (2013.01); *B29K 2105/0097* (2013.01)

(58) Field of Classification Search
CPC ........ B29D 11/00298; B29D 11/00307; B29D 11/00365; B29D 11/0074; G02B 3/0056; G02B 3/0075; G02B 3/0062; B29C 33/00; B29C 33/0033; B29C 33/485
See application file for complete search history.

(56) References Cited

U.S. PATENT DOCUMENTS

| 5,444,520 A * | 8/1995 | Murano ................. B41J 2/465 347/244 |
| 7,564,496 B2 * | 7/2009 | Wolterink ............ G02B 13/006 257/432 |
| 2009/0159200 A1 * | 6/2009 | Rossi ................ H01L 27/14683 156/292 |
| 2011/0220278 A1 * | 9/2011 | Rudmann ........ B29D 11/00278 156/250 |
| 2012/0154945 A1 * | 6/2012 | Hiatt ................. H01L 27/14618 359/894 |

(Continued)

FOREIGN PATENT DOCUMENTS

| CN | 101946199 A | 1/2011 |
| CN | 102005392 A | 4/2011 |
| EP | 2193911 A2 | 6/2010 |

OTHER PUBLICATIONS

Taiwan Application No. 105122789 English Translation of May 19, 2017 Office Action dated May 30, 2017, 3 pages.

(Continued)

*Primary Examiner* — George R Koch
*Assistant Examiner* — Jimmy R Smith, Jr.
(74) *Attorney, Agent, or Firm* — Lathrop GPM LLP

(57) ABSTRACT

A method of manufacturing an optical spacer includes dispensing thermal glue within a mold; pressing the thermal glue using an optical spacer substrate to generate an optical spacer including an aperture; and, releasing the mold from the optical spacer. The thermal glue may be cured prior to releasing the mold from the optical spacer.

9 Claims, 2 Drawing Sheets

(56) References Cited

U.S. PATENT DOCUMENTS

2012/0188635 A1\* 7/2012 Kubala ................ G02B 7/003
　　　　　　　　　　　　　　　　　　　　　359/356
2015/0035180 A1 　2/2015 Shen et al.

OTHER PUBLICATIONS

Chinese Patent Application No. 201610638404.2 First Office Action dated May 14, 2019 with English translation, 12 pages.
Chinese Patent Application No. 201610638404.2, Second Office Action dated Feb. 3, 2020, 6 pages.
Translation of Chinese Patent Application No. 201610638404.2, Second Office Action dated Feb. 3, 2020, 7 pages.

\* cited by examiner

OPTICAL SPACER INCLUDING CONTROLLED LOCATED APERTURE AND METHOD OF MANUFACTURING THE SAME

BACKGROUND

Conventional lens apertures are made utilizing binary pseudo random (BPR) and chromium (Cr) processes. However, these lens apertures are limited in location and structure. For example, FIG. 1 depicts a lens wafer array 100 including a typical lens aperture 106 made from a prior art manufacturing process. Lens array 100 includes an array of lenses 102(1)-(4) formed on a substrate 104 and a lens aperture 106 subsequently formed between individual lenses 102 of the array. The lens apertures 106 formed from this manufacturing process are limited in height and size based upon the lens size, shape, and configuration.

SUMMARY OF THE INVENTION

A method of manufacturing an optical spacer includes dispensing thermal glue within a mold; pressing the thermal glue using an optical spacer substrate to generate an optical spacer including an aperture; and, releasing the mold from the optical spacer. The thermal glue may be cured prior to releasing the mold from the optical spacer.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

The embodiments disclosed herein utilize a process of manufacturing that creates an optical spacer from thermal glue or adhesive. The optical spacer enables control of the location of the aperture by varying the configuration of the thermal glue.

Figure 1:
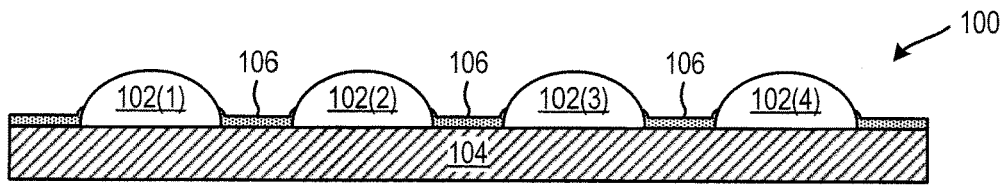
FIG. 1 depicts a lens wafer array including a typical lens aperture made from a prior art manufacturing process.
Figure 2:
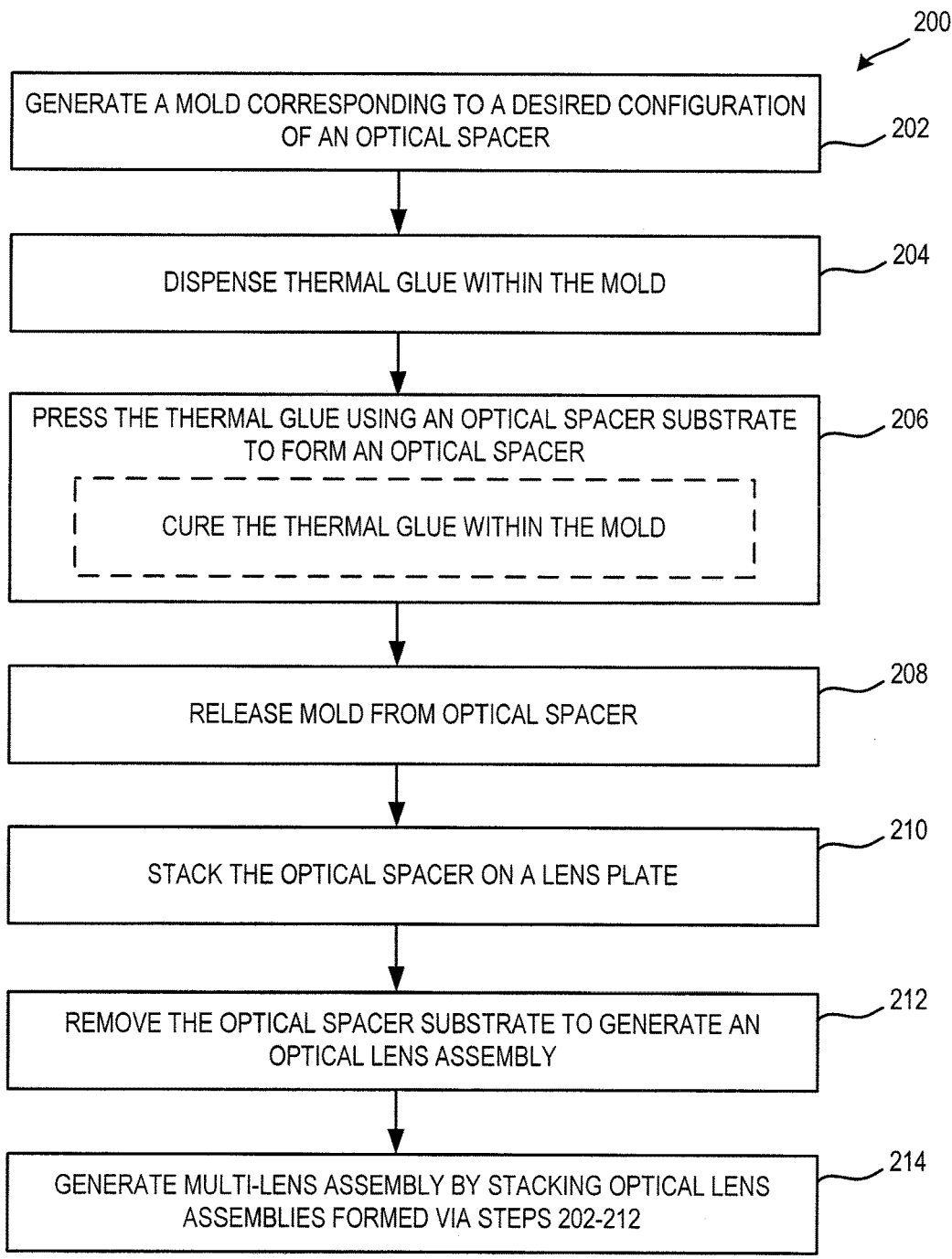
FIG. 2 depicts a method of manufacturing an optical spacer including a controlled located aperture, according to an embodiment.
Figure 3:
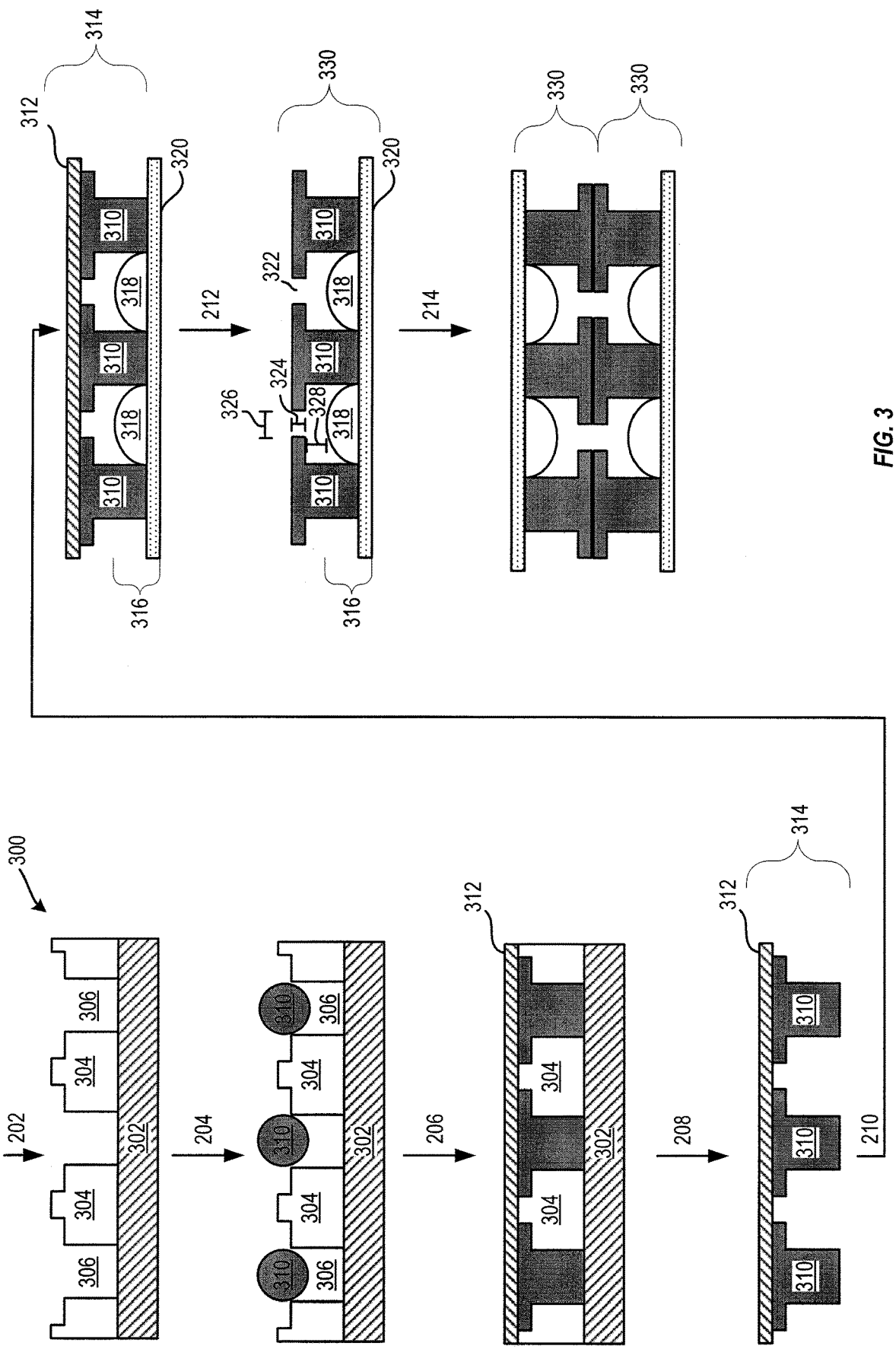
FIG. 3 depicts a structural diagram of the FIG. 3 method.

FIG. 2 depicts a method 200 of manufacturing an optical spacer including a controlled located aperture. FIG. 3 depicts a structural diagram 300 of the steps of method 200. It should be appreciated that diagram 300 is not limiting in size, shape, and configuration of the structural components depicted therein. FIGS. 2 and 3 are best viewed together with the following description. Not all elements may be labeled within FIG. 3 for clarity of illustration.

In step 202, method 200 generates a mold corresponding to a desired configuration of an optical spacer. In one example of step 202, a mold 300 is generated from mold material 304 placed on a mold substrate 302 to create areas 306 defined by the boundaries of the mold material 304. Mold material 304 may be integral (i.e. formed of a single continuous material) to mold substrate 302, or may be attached onto a substrate of the same or different material. Areas 306 may be the inverse of the desired configuration of the resulting optical spacer formed using mold 300.

In step 204, thermal glue is dispensed within the mold. In one example of step 204, thermal glue 310 is dispensed within areas 306.

In step 206, the thermal glue is pressed via an optical spacer substrate to form the thermal glue according to the mold. In one example of step 206, optical spacer substrate 312 is brought into contact with mold material 304 on the opposing side of mold substrate 302. The thermal glue 310 may then be baked or otherwise set for a given amount of time to cure.

In step 208, the mold is released from the cured optical spacer. In one example of step 208, mold 300 is released from the cured thermal glue 310, thereby leaving cured optical spacer 314.

In step 210, the optical spacer of step 208 is stacked on a lens plate. In one example of step 210, optical spacer 314 is stacked onto lens plate 316 including lenses 318 on lens plate substrate 320. The surface of optical spacer 314 that is opposite the optical spacer substrate may be adhered or otherwise attached to lens plate 316.

In step 212, the optical spacer substrate is removed thereby providing a lens assembly including a controlled optical aperture for the lens. In one example of step 212, optical spacer substrate 312 is removed from thermal glue 310, thereby providing a lens assembly 330 including an optical aperture 322 for lens 318. The height 324, width 326 and distance 328 away from lens 318 are each independently controllable based upon the configuration of mold 300. Advantageously, any configuration of the aperture is possible such that various optical characteristics of the lenses are possible (i.e. controlling the MTF of the optical lens assembly).

In optional step 214, one or more lens assemblies formed via steps 202-212 are stacked together to produce a multi-lens lens assembly. Each lens assembly 330 may then be singulated into individual multi-lens lens assemblies if desired.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of manufacturing an optical lens assembly including an optical spacer, the method comprising:
    dispensing thermal glue within a mold, the mold being disposed on a substrate top-surface of a mold substrate, and including a plurality of pillars, each of the plurality of pillars having (a) a first surface at a first height above the substrate top-surface, (b) a pillar top-surface at a second height above the substrate top-surface that exceeds the first height, (c) a first width at the first height, and (d) a second width at the second height that is less than the first width;
    pressing the thermal glue using an optical spacer substrate to generate the optical spacer including an aperture having an aperture-width determined by the second width;
    releasing the mold from the optical spacer;
    stacking the optical spacer onto a lens plate including plurality of lenses and a lens plate substrate, the aperture being aligned to one lens, of the plurality of lenses, a diameter of the one lens exceeding the aperture-width;

wherein the step of stacking includes adhering a surface of the optical spacer opposite the optical spacer substrate to the lens plate substrate; and removing the optical spacer substrate to generate the optical lens assembly.

2. The method of claim 1, further comprising generating the mold, corresponding to a desired configuration of the optical spacer, by attaching a mold material to the mold substrate such that areas defined by the boundaries of the mold material are created, the areas having the inverse shape of the desired configuration of the optical spacer.

3. The method of claim 2, wherein the step of pressing the thermal glue comprises bringing the optical spacer substrate in contact with a surface of the mold material opposite the mold substrate.

4. The method of claim 1, further comprising curing the thermal glue used to generate the optical spacer prior to releasing the mold from the optical spacer.

5. The method of claim 1, further comprising producing a multi-lens optical assembly by stacking the optical lens assembly to at least one other optical lens assembly.

6. The method of claim 1, further comprising generating the mold, corresponding to a desired configuration of the optical spacer, by providing a mold material and the mold substrate as a single piece of integral material.

7. The method of claim 1, the one lens including a non-planar surface that includes a surface-region that is entirely within the aperture.

8. The method of claim 1, the aperture being one of a plurality of apertures of the optical spacer, and in the step of stacking, each of the plurality of apertures is aligned to a respective lens of the plurality of lenses.

9. The method of claim 1, the mold being formed of a mold material and including a plurality of regions defined by boundaries of the mold material, the step of dispensing the thermal glue comprising dispensing, into each of the plurality of regions, a volume of thermal glue.

* * * * *